United States Patent
Rhee et al.

(10) Patent No.: US 8,792,514 B2
(45) Date of Patent: Jul. 29, 2014

(54) PACKET SWITCHING SYSTEM AND METHOD

(75) Inventors: June Koo Rhee, Daejeon (KR); Chan-Kyun Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 530 days.

(21) Appl. No.: 13/113,444

(22) Filed: May 23, 2011

(65) Prior Publication Data

US 2012/0087375 A1  Apr. 12, 2012

(30) Foreign Application Priority Data

Oct. 7, 2010  (KR) .................. 10-2010-0097931

(51) Int. Cl.
*H04L 12/70*  (2013.01)
*H04L 12/56*  (2006.01)
*H04J 14/00*  (2006.01)
*H04Q 11/00*  (2006.01)

(52) U.S. Cl.
CPC ............ *H04L 49/15* (2013.01); *H04Q 11/0005* (2013.01); *H04Q 11/0062* (2013.01)
USPC ........... 370/429; 370/389; 370/412; 370/413; 370/414; 370/428; 398/43; 398/45; 398/46; 398/48; 398/49

(58) Field of Classification Search
CPC ..... H04L 49/00; H04L 49/15; H04L 49/1507; H04L 49/1515; H04L 49/30; H04L 49/3027; H04Q 11/00; H04Q 11/0001; H04Q 11/0003; H04Q 11/0005; H04Q 11/0062
USPC ................. 370/389, 412, 413, 414, 428, 429; 398/43, 45, 46, 48, 49
See application file for complete search history.

(56) References Cited

U.S. PATENT DOCUMENTS

| | | | | |
|---|---|---|---|---|
| 5,377,182 A | * | 12/1994 | Monacos | 370/219 |
| 5,699,520 A | * | 12/1997 | Hodgson et al. | 709/234 |
| 5,831,980 A | | 11/1998 | Varma et al. | |
| 7,408,927 B2 | | 8/2008 | George | |
| 2002/0024700 A1 | * | 2/2002 | Yokoyama et al. | 359/135 |
| 2003/0030866 A1 | * | 2/2003 | Yoo | 359/128 |

FOREIGN PATENT DOCUMENTS

KR  1019990051796  7/1999

OTHER PUBLICATIONS

M. Hluchyj and M. Karol, "Queueing in High-Performance Packet Switching". IEEE Journal on Selected Areas in Communications, vol. 6. No. 9, Dec. 1988, pp. 1587-1597.

* cited by examiner

*Primary Examiner* — Ayaz Sheikh
*Assistant Examiner* — Tarell Hampton
(74) *Attorney, Agent, or Firm* — Gifford, Krass, Sprinkle, Anderson & Citkowski, P.C.

(57) ABSTRACT

A packet switching system includes a plurality of switch fabrics connected in cascade and a plurality of buffers respectively connected to the plurality of switch fabrics. In the event of packet competition, the plurality of switch fabrics buffer the competing packets to the corresponding buffers through buffer connection ports, and forward the competing packets in excess of the number of buffer connection ports to an adjacent switch fabric through switch connection ports.

16 Claims, 9 Drawing Sheets

FIG. 7

| Network load (ρ) \ Number of switch fabrics (w) | 0.1 | 0.2 | 0.3 | 0.4 | 0.5 | 0.6 | 0.7 | 0.8 | 0.9 | 1.0 |
|---|---|---|---|---|---|---|---|---|---|---|
| 1 | 35 | 44 | 51 | 56 | 60 | 63 | 65 | 67 | 68 | 70 |
| 2 | 22 | 30 | 36 | 42 | 48 | 50 | 56 | 59 | 62 | 63 |
| 3 | 16 | 22 | 28 | 33 | 39 | 44 | 49 | 53 | 56 | 58 |
| 4 | 12 | 18 | 24 | 29 | 34 | 40 | 44 | 48 | 52 | 56 |
| 5 | 10 | 16 | 21 | 26 | 32 | 36 | 41 | 45 | 50 | 53 |
| 6 | 9 | 14 | 19 | 24 | 29 | 34 | 39 | 43 | 48 | 52 |
| 7 | 8 | 12 | 18 | 23 | 28 | 32 | 37 | 42 | 46 | 50 |
| 8 | 7 | 12 | 17 | 21 | 26 | 31 | 36 | 40 | 45 | 49 |

Unit:%

PACKET SWITCHING SYSTEM AND METHOD

CROSS-REFERENCE TO RELATED APPLICATION

This application claims priority to and the benefit of Korean Patent Application No. 10-2010-0097931 filed in the Korean Intellectual Property Office on Oct. 7, 2010, the entire content of which is incorporated herein by reference.

BACKGROUND OF THE INVENTION (a) Field of the Invention

The present invention relates to a packet switching system and method.

(b) Description of the Related Art

A packet switching system is a system for switching an input packet to an output port corresponding to a destination address of a packet input through an input port. Such a packet switching system includes a switch fabric for switching to the output port according to the destination of the packet. At this point, if there are two or more packets destined for one output port, competition takes place inside the switch fabric.

Particularly, because the output port of an input packet cannot be predicted in a space division switching network, it may occur that two or more packets in a time slot have one output port as a destination. At this time, because only one packet can be switched to the output port, a competition for the output port between the remaining packets occurs.

To mediate such packet competition, a method using a buffer is mainly used. That is, a switch fabric transmits competing packets to a buffer to buffer them, and then switches the packets being buffered to an output port when the output port is idle.

The packet switching system of this type is designed to have a single switch fabric and a single buffer. Thus, if the scale of the network grows, the hardware structure of the switch fabric becomes complicated, and the switch fabric size and the buffer size need to be increased. Accordingly, the number of buffer ports and the number of interfaces also need to be increased, and therefore the power consumption and cost of the system increases. This imposes a limitation on network expandability.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a packet switching system and method.

An exemplary embodiment of the present invention includes a packet switching system. The packet switching system includes: a plurality of sequentially connected switch fabrics for receiving and processing a transmitted packet; and a plurality of buffers respectively connected to the plurality of switch fabrics. Each switch fabric includes: first switch connection ports for connecting to a first switch fabric adjacent in a first direction; second switch connection ports for connecting to a second switch fabric adjacent in a direction opposite to the first direction; and first buffer connection ports for forwarding competing packets.

Another embodiment of the present invention provides a method for a switch fabric of a packet switching system to switch a packet. The packet switching method includes: checking the destination of a packet input through a plurality of input ports; if there are a plurality of packets having a specific output port among a plurality of output ports as the destination, switching only one of the plurality of packets to the specific output port; if there are competing packets including the remaining packets excluding one of the plurality of the packets, switching a number of packets equal to the number of available buffer connection ports among the plurality of buffer connection ports for connecting to a first buffer allocated to the switch fabric and buffering the packets; and forwarding the packets in excess of the number of available buffer connection ports among the competing packets to a neighbor switch fabric adjacent in a first direction.

Still another embodiment of the present invention provides a packet switching system in an optical network. The packet switching system includes: a plurality of switch fabrics connected in cascade for receiving packets of respective assigned wavelengths and switching the packets to a destination; and a plurality of buffers respectively connected to the plurality of switch fabrics. Each of the plurality of switch fabrics includes: a plurality of buffer connection ports for respectively connecting to the plurality of buffers; first switch connection ports for connecting to a neighbor switch fabric adjacent in a first direction; second switch connection ports for connecting to a neighbor switch fabric adjacent in a second direction opposite to the first direction; and a switching controller. The switching controller switches at least a portion of first competing packets generated in itself and second competing packets received from the neighbor switch fabric adjacent in the second direction through the second switch connection ports to available ones of the plurality of buffer connection ports.

BRIEF DESCRIPTION OF THE DRAWINGS

FIG. 7 is a view showing the minimum rate of buffer sharing for achieving a packet loss rate of $10^{-6}$ or less.

DETAILED DESCRIPTION OF THE EMBODIMENTS

Figure 1:
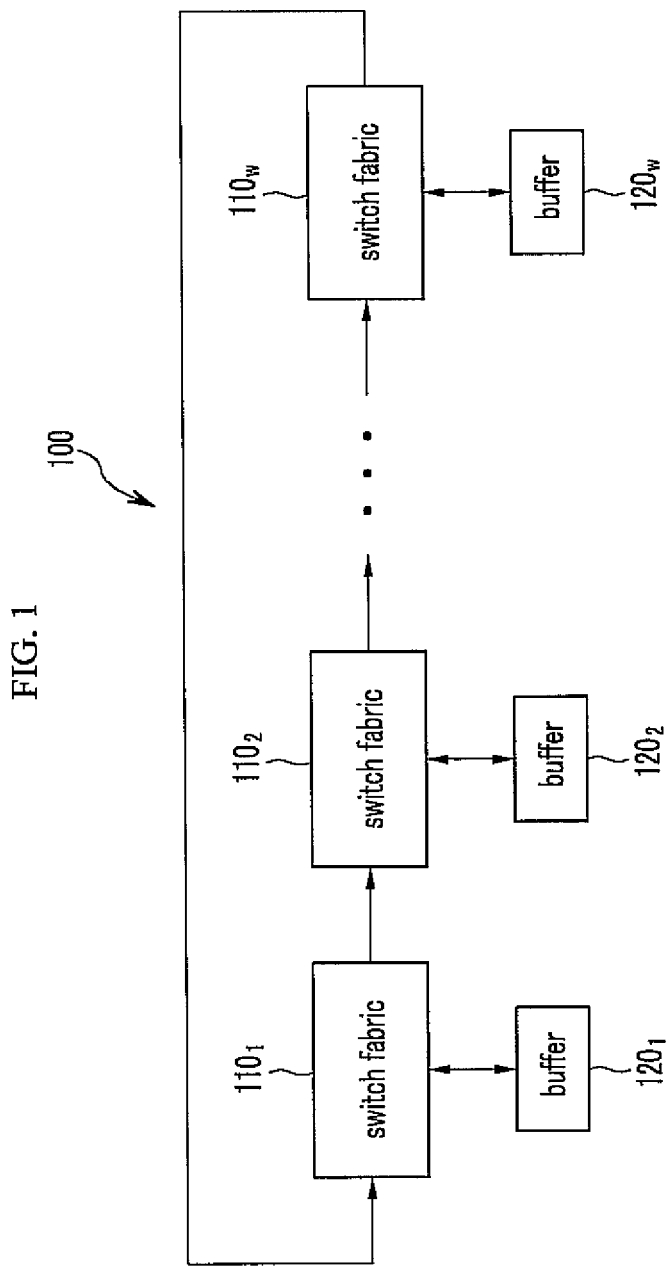
FIG. 1 is a view schematically showing a packet switching system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

Now, a packet switching system and method according to an exemplary embodiment of the present invention will be described in detail with reference to the drawings.

Figure 2:
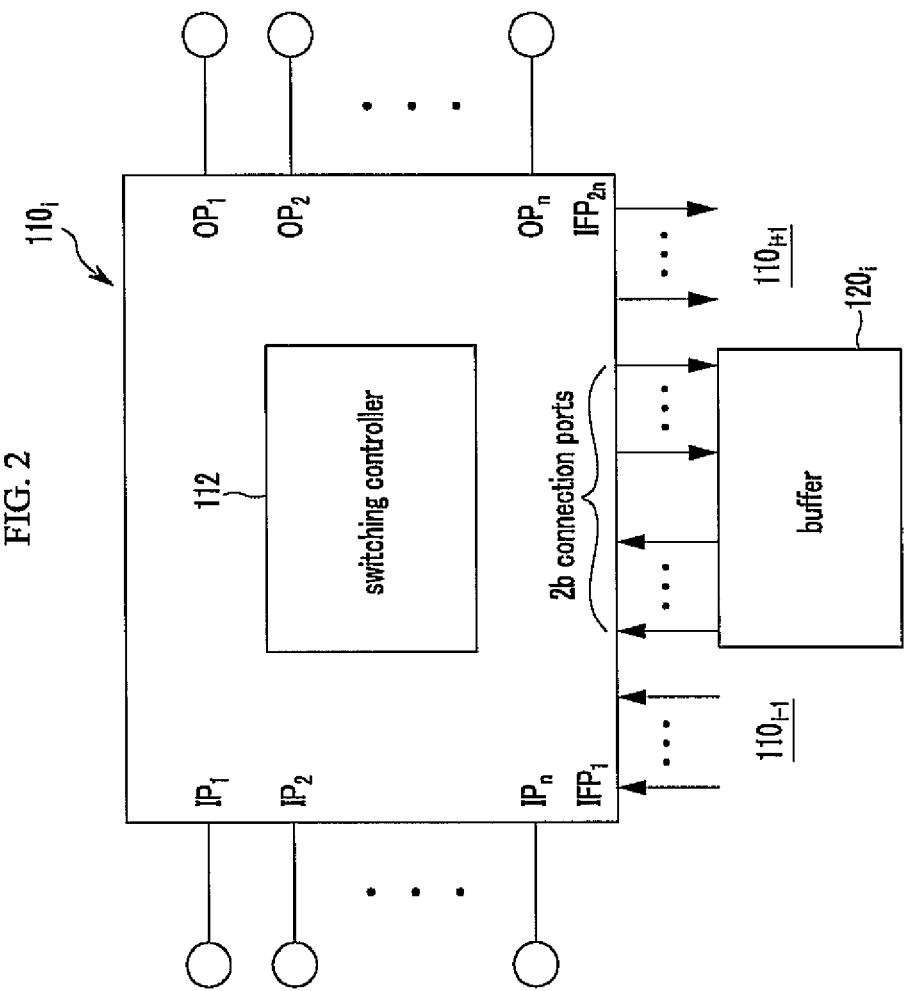
FIG. 2 is a view showing a switch fabric according to a first exemplary embodiment of the present invention.

FIG. 1 is a view schematically showing a packet switching system according to an exemplary embodiment of the present invention. FIG. 2 is a view showing a switch fabric according to a first exemplary embodiment of the present invention.

Referring to FIG. 1, a packet switching system 100 according to an exemplary embodiment of the present invention includes a plurality of switch fabrics $110_1$ to $110_w$ and a plurality of buffers $120_1$ to $120_w$ respectively allocated to the plurality of switch fabrics $110_1$ to $110_w$.

Referring to FIG. 2, the plurality of switch fabrics $110_1$ to $110_w$ include a plurality of input ports $IP_1$ to $IP_n$, a plurality of output ports $OP_1$ to $OP_n$, a plurality of connection ports $IFP_1$ to $IFP_{2n}$, and a switching controller 112.

Although FIG. 2 illustrates only the i-th switch fabric $110_i$ among the plurality of switch fabrics $110_1$ to $110_w$, the other switch fabrics can also be configured in the same way as the i-th switch fabric $110_i$. For convenience of explanation, the following description will be given with respect to the i-th switch fabric $110_i$.

The input ports $IP_1$ to $IP_n$ are used to receive packets, and the output packets $OP_1$ to $OP_n$ are used to transmit packets.

2b connection ports among the connection ports $IFP_1$ to $IFP_{2n}$ are used to connect to the buffers, and a (2n−2b) number of connection ports among the connection ports $IFP_1$ to $IFP_{2n}$ are used to connect to the adjacent switch fabrics $110_{i-1}$ and $110_{i+1}$. Hereinbelow, the connection ports among the connection ports $IFP_1$ to $IFP_{2n}$ used to connect to the buffers are referred to as buffer connection ports, and the connection ports among the connection ports $IFP_1$ to $IFP_{2n}$ used to connect to the switch fabrics $110_{i-1}$ and $110_{i+1}$ are referred to as switch connection ports.

The buffer connection ports include output buffer connection ports for outputting a packet to the buffer $120_i$ to buffer the packet, and input buffer connection ports for inputting the packet being buffered into the buffer $120_i$. At this time, among the 2b buffer connection ports, b buffer connection ports can be used as the output buffer connection ports, and b buffer connection ports can be used as the input buffer connection ports.

The switch connection ports include input switch connection ports for connecting to the previous switch fabric $110_{i-1}$ among the adjacent switch fabrics $110_{i-1}$ and $110_{i+1}$, and output switch connection ports for connecting to the subsequent switch fabric $110_{i+1}$ among them. At this time, among the (2n−2b) number of switch connection ports, an (n−b) number of switch connection ports can be used as input switch connection ports, and the remaining (n−b) number of switch connection ports can be used as output switch connection ports.

That is, the plurality of switch fabrics $100_1$ to $100_w$ are connected to the adjacent switch fabrics. Specifically, the i-th switch fabric $100_i$ is connected to the previous (i−1)-th switch fabric $100_{i-1}$ through the input switch connection ports, and connected to the (i+1)-th switch fabric $100_{i+1}$ through the output switch connection ports.

The switching controller 112 checks the destination address of a packet input into the input port $IP_1$ to $IP_n$, and switches the packet to the output port $OP_1$ to $OP_n$ corresponding to the destination address. At this point, if there are a plurality of packets destined for one output port, the switching controller 112 switches only one packet to the corresponding output port, and processes the remaining packets as competing packets.

If there are competing packets, the switching controller 112 switches the competing packets to the output buffer connection ports. If the b output buffer connection ports are all in use, the competing packets are forwarded to an adjacent switch fabric, for example, the (i+1)-th switch fabric $110_{i+1}$, through the output switch connection ports.

Moreover, the switching controller 112 may receive the competing packets through the input switch connection ports from the adjacent (i−1)-th switch fabric $110_{i-1}$. Accordingly, the number of competing packets in the i-th switch fabric $110_i$ is equal to the sum of the number of competing packets generated in itself and the number of competing packets received from the (i−1)-th switch fabric $110_{i-1}$.

Now, a method for processing competing packets in the i-th switch fabric $110_i$ will be described with reference to FIG. 3.

Figure 3:
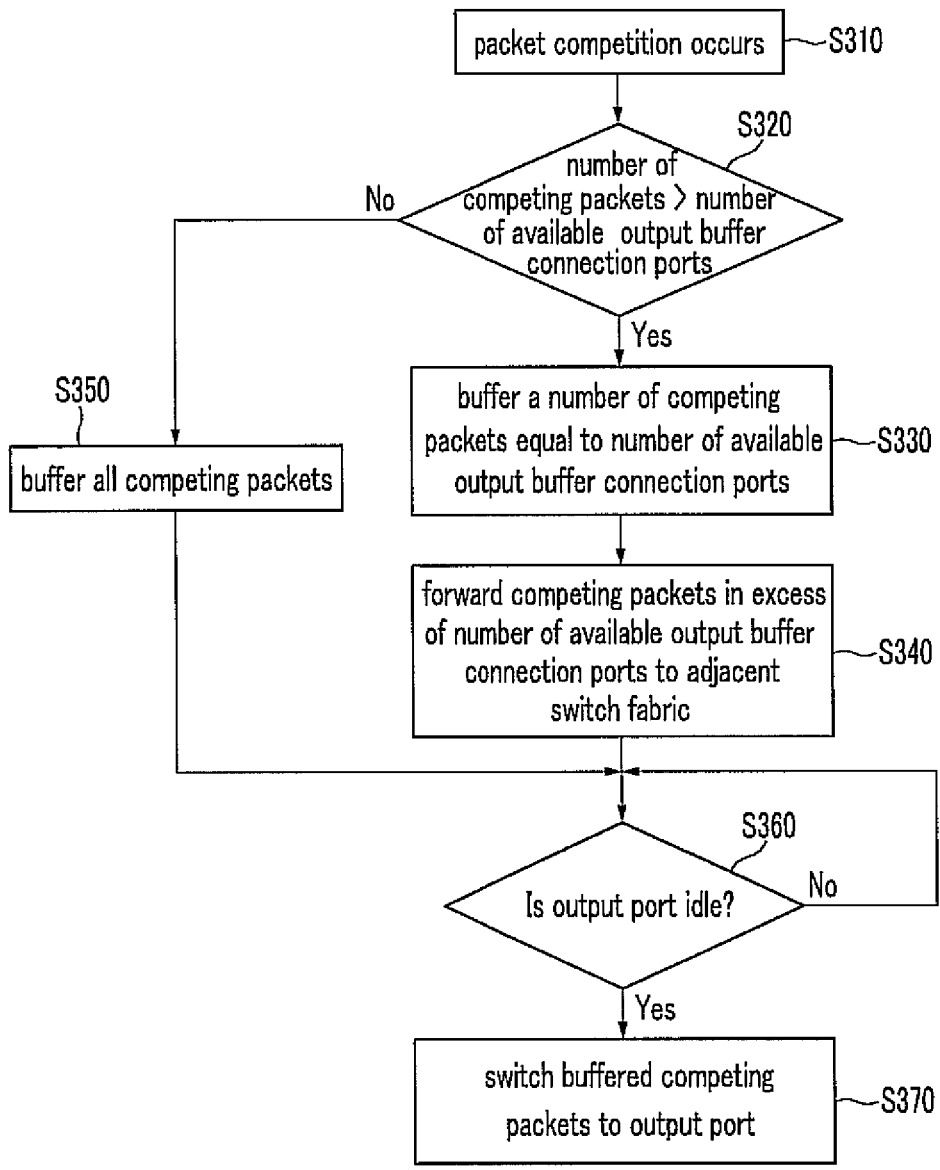
FIG. 3 is a view showing a competing packet processing method according to an exemplary embodiment of the present invention.

FIG. 3 is a view showing a competing packet processing method according to an exemplary embodiment of the present invention.

Referring to FIG. 3, in the event of packet competition, the switching controller 112 compares the number of competing packets with the number of currently available output buffer connection ports (S320).

If the number of competing packets is greater than the number of currently available output buffer connection ports, the switching controller 112 switches a number of competing packets equal to the number of currently available output buffer connection ports to the output buffer connection ports to buffer the packets in the buffer $120_i$ (S330). Thereafter, the switching controller 112 switches the remaining competing packets in excess of the number of available output buffer connection ports among the competition packets to the output switch connection ports, and forwards the remaining competing packets to the adjacent (i+1)-th switch fabric $110_{i+1}$ (S340).

On the contrary, if the number of competing packets is less than the number of currently available output buffer connection ports, the switching controller 112 switches all the competing packets to the output buffer connection ports to buffer them in the buffer $120_i$ (S350).

The switching controller 112 switches the buffered competing packets to the corresponding output port each time the output port to which the buffered competing packets are to be switched becomes idle (S360 to S370).

Upon receiving competing packets from the (i−1)-th switch fabric $110_{i-1}$, the switching controller 112 has to schedule its own competing packets and the received competing packets in order to switch the competing packets to the output buffer connection ports. At this point, too large an additional amount of calculation and too high a scheduling complexity will be needed to schedule the competing packets forwarded from the (i−1)-th switch fabric $110_{i-1}$. Accordingly, the switching controller 112 according to the exemplary embodiment of the present invention is able to process the competing packets according to the competition rule that the competing packets forwarded from the adjacent (i−1)-th switch fabric $110_{i-1}$ should be forwarded to the buffer $120_i$ connected to the current switch fabric or again to the adjacent (i+1)-th switch fabric $110_{i+1}$.

For example, if the number of competing packets generated in itself is 5, the number of competing packets received from the (i−1)-th switch fabric $110_{i-1}$ is 4, and the number of available output buffer connection ports is 6, the switching controller 112 switches its own five competing packets and one of the competing packets received from the (i−1)-th switch fabric $110_{i-1}$ to the output buffer connection ports, and switches the remaining three competing packets received from the (i−1)-th switch fabric $110_{i-1}$ to the output switch connection ports. Using this scheduling method, a significant increase in an additional amount of calculation and scheduling complexity can be prevented.

Moreover, the packet switching system 100 according to the exemplary embodiment of the present invention can process competing packets generated in any one of the plurality of switch fabrics $110_1$ to $110_w$ connected in cascade through the input and output switch connection ports by means of the buffer allocated to a neighboring switch fabric, thereby reducing the packet loss rate. In addition, network expandability can be improved merely by increasing the number of switch fabrics without any hardware changes in the switch fabrics even if the network size becomes large. Also, less buffer ports and interfaces are required, though the number of switch fabrics $110_1$ to $110_w$ and the number of buffers $120_1$ to $120_w$ according to the exemplary embodiment of the present invention are larger than those of the conventional single switch fabric and single buffer, so the cost for implementing the overall packet switching system 100 can be reduced.

The packet switching system according to the exemplary embodiment of the present invention may suffer from the following three types of packet loss. First, if the sum of competing packets generated in the respective switch fabrics $110_1$ to $110_w$ is greater than the sum of the number of output buffer connection ports of the switch fabrics, the competing packets cannot be buffered in all the buffers $120_1$ to $120_w$. Thus, the process of forwarding the competing packets to adjacent switch fabrics without being buffered in the buffers $120_1$ to $120_w$ is repeated infinitely. As a consequence, packet loss occurs.

Second, if the number of competing packets forwarded to the (i+1)-th switch fabric $110_{i+1}$ from the i-th switch fabric $110_i$ is greater than the number of output switch connection ports of the i-th switch fabric $110_i$, the competing packets in excess of the number of output switch connection ports cannot be forwarded to the (i+1)-th switch fabric $110_{i+1}$, which leads to packet loss.

Third, when the sum of competing packets generated in the respective switch fabrics $110_1$ to $110_w$ exceed the size of the buffers $120_1$ to $120_w$ due to insufficient size of queues allocated to the switch fabrics $110_1$ to $110_w$, packet loss may occur.

In the exemplary embodiment of the present invention, devices such as RAM (random access memory) ensuring a very large buffer size are used as the buffers $120_1$ to $120_w$. Accordingly, only the first and second types of packet loss are to be taken into account, while ignoring the packet loss caused by the buffer size.

Packet loss in the packet switching system 100 according to the exemplary embodiment of the present invention will be described with reference to FIGS. 4 to 7.

Figure 4:
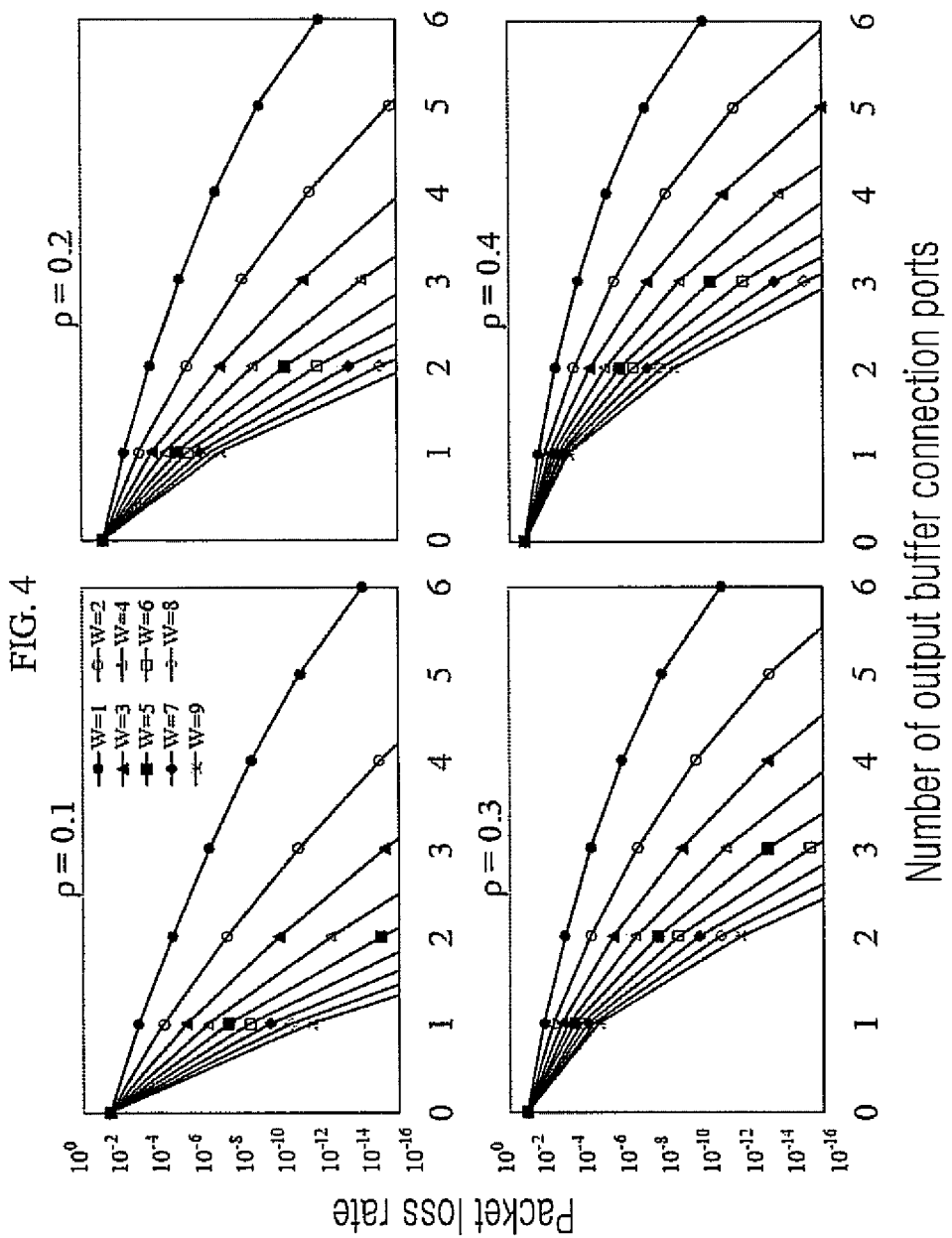
FIGS. 4 to 6 are views showing the rate of external buffer sharing for different network loads and the packet loss rate according to the rate of external buffer sharing.
Figure 5:
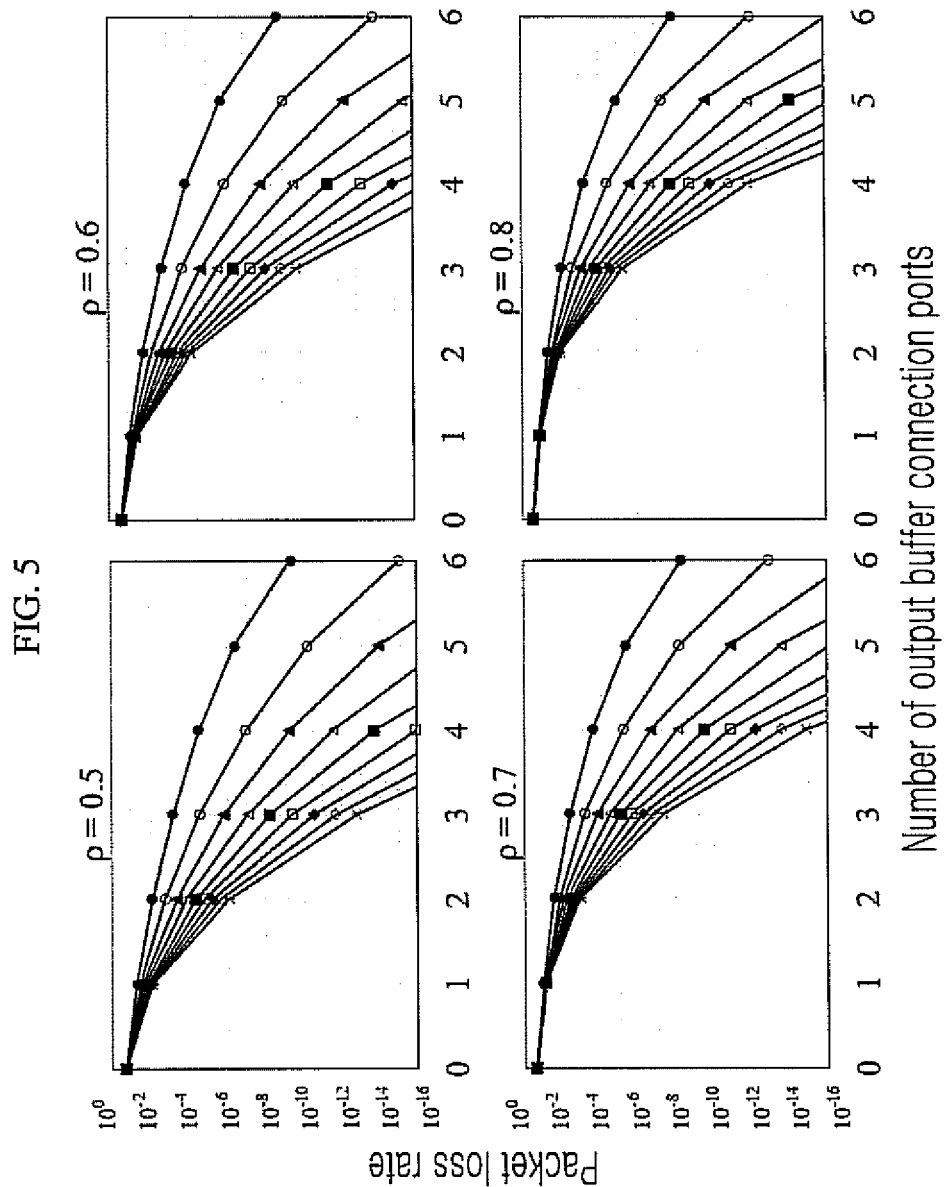
Figure 6:
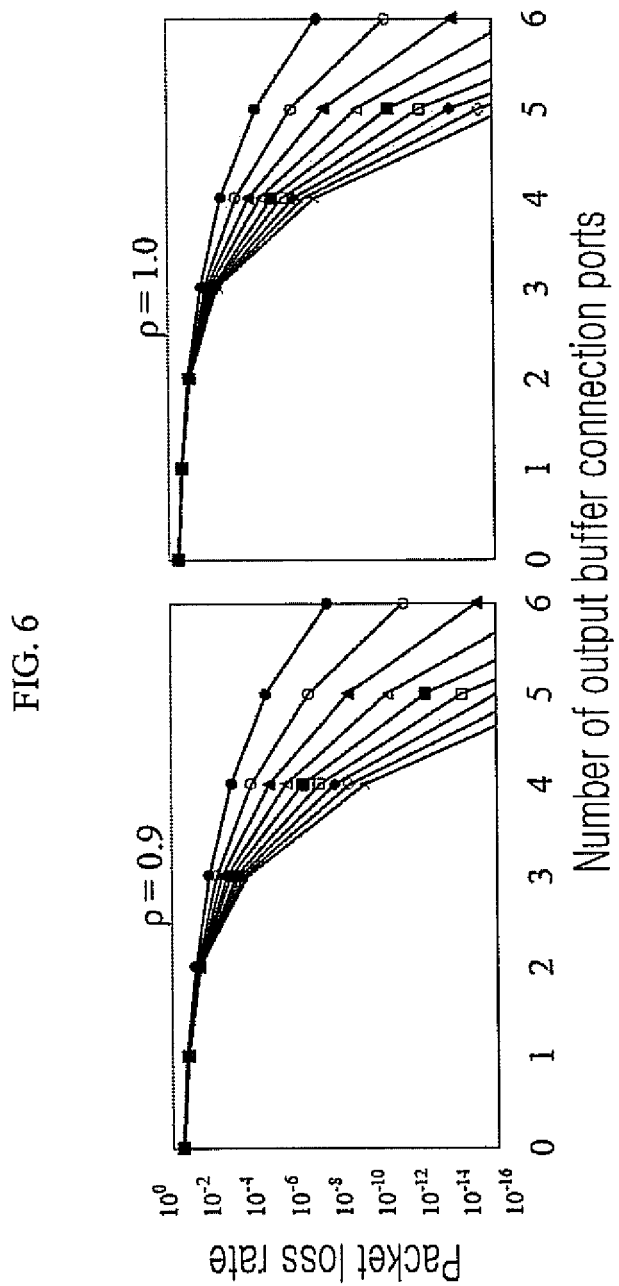

FIGS. 4 to 6 are views showing the rate of external buffer sharing for different network loads and the packet loss rate according to the rate of external buffer sharing. FIG. 7 is a view showing the minimum rate of buffer sharing for achieving a packet loss rate of $10^{-6}$ or less.

In FIGS. 4 to 6, 8*8 switch fabrics are considered as the switch fabrics $110_1$ to $110_w$, and are used for calculation.

In the packet switching system 100 according to the exemplary embodiment of the present invention, it is found that the packet loss rate decreases abruptly with an increase in the rate of internal buffer sharing between the switch fabrics $110_1$ and $110_w$, and the buffers $120_1$ to $120_w$, i.e., the degree of connection between the switch fabrics $110_1$ and $110_w$ and the buffers $120_1$ to $120_w$, for network loads ρ of 0.1 to 1.10. That is, as the rate of internal buffer sharing increases, more competing packets can be buffered in the buffers $120_1$ to $120_w$, thus minimizing the packet loss rate of the network.

However, the increase in the rate of external buffer sharing leads to an increase in the number of interfaces, and this may result in loss in terms of cost and electricity.

Moreover, referring to FIGS. 4 to 6, it can be seen that, in the packet switching system 100 according to the exemplary embodiment of the present invention, the packet loss rate decreases with an increase in the rate of external buffer sharing of the switch fabrics $110_1$ and $110_w$, i.e., the number of adjacent switches for network loads ρ of 0.1 to 1.10.

That is, a packet not buffered in the corresponding switch fabric can be forwarded to another switch fabric through a switch buffer port and buffered in a buffer allocated to the other switch fabric, so the packet loss rate of the network can be reduced.

Although no packet loss should occur in an ideal network, a packet loss rate of $10^{-6}$ or less is generally regarded as the minimum packet loss rate that can be present for various network services.

FIG. 7 shows a table representing the buffer sharing rate S with the external buffer sharing rate w changing from 1 to 8 at network loads ρ of 0.1 to 1.0 based on a simulation result of FIG. 6.

Here, the buffer sharing rate S can be defined by Equation 1.

$$S=b/\{b+(n-b)\}$$ [Equation 1]

That is, the buffer sharing rate S is defined as the percentage of the number of output buffer connection ports to the sum of the number b of output buffer connection ports and the number (n−b) of output switch connection ports.

Accordingly, the minimum value of the number of output buffer connection ports for ensuring the packet loss rate of $10^{-6}$ or less can be calculated by multiplying the buffer sharing rate S by the number n of connection ports.

In one example, referring to FIG. 7, if the external buffer sharing rate w of 8*8 switch fabrics $110_1$ to $110_w$ is 4 and the network load ρ is 0.5, the buffer sharing rate S is 34%. Thus, by using three (=⌈0.34*8⌉) out of eight connection ports as buffer connection ports and five out of them as switch connection ports, the packet loss rate of $10^{-6}$ or less can be ensured.

By controlling the internal buffer sharing rate and the external buffer sharing rate according to the condition of the network by this method, the cost of system implementation can be reduced while meeting the packet loss rate requirement.

Figure 8:
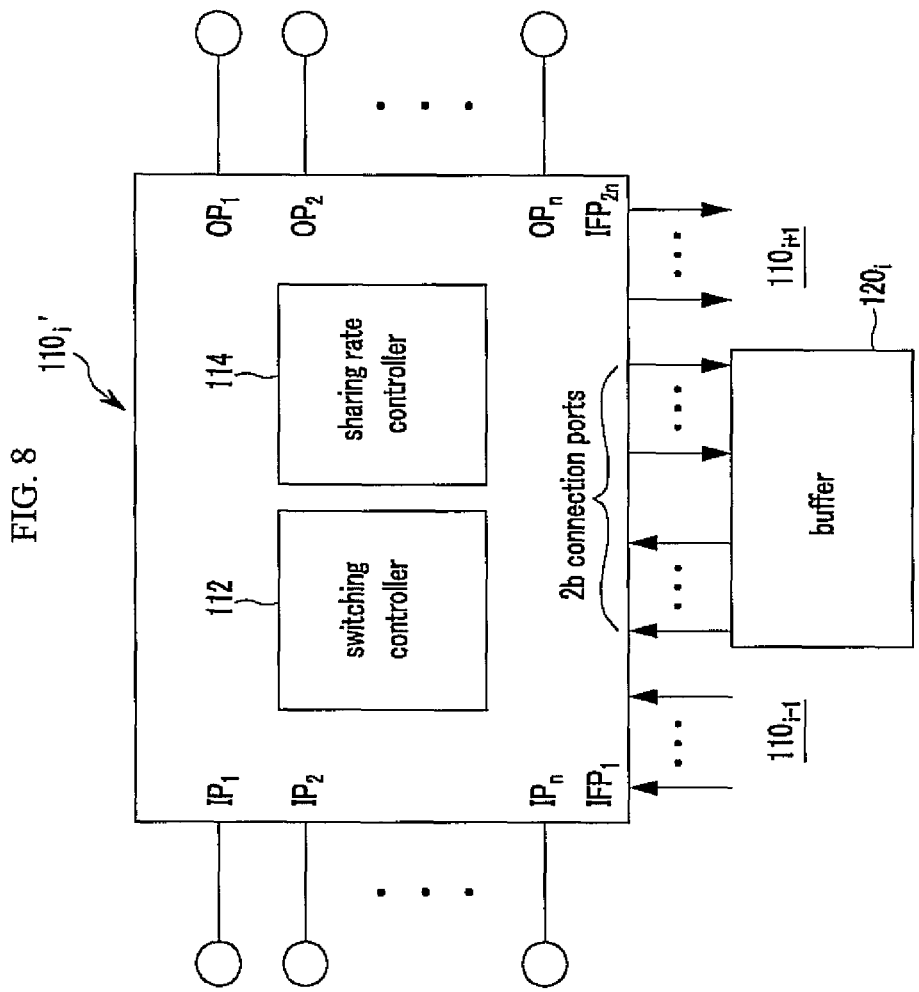
FIG. 8 is a view showing switch fabrics according to a second exemplary embodiment of the present invention.

FIG. 8 is a view showing switch fabrics according to a second exemplary embodiment of the present invention.

Referring to FIG. 8, the switch fabric $110_i'$ may further include a sharing rate controller 114.

The sharing rate controller 114 controls the internal buffer sharing rate and the external buffer sharing rate in order to ensure the packet loss rate of $10^{-6}$ or less according to network conditions or according to operator control.

As previously illustrated in FIG. 7, if the external buffer sharing rate w of 8*8 switch fabrics $110_1$ to $110_w$ is 4 and the network load ρ is 0.5, the sharing rate controller 114 controls the connection of connection ports $IFP_1$ to $IFP_{16}$ such that three out of a total of 16 connection ports $IFP_1$ to $IFP_{16}$ are used as output buffer connection ports, three of them are used as input buffer connection ports, five of them are used as input switch connection ports, and five of them are used as output switch connection ports.

The packet switching system 100 according to the exemplary embodiment of the present invention is applicable to an optical network.

Figure 9:
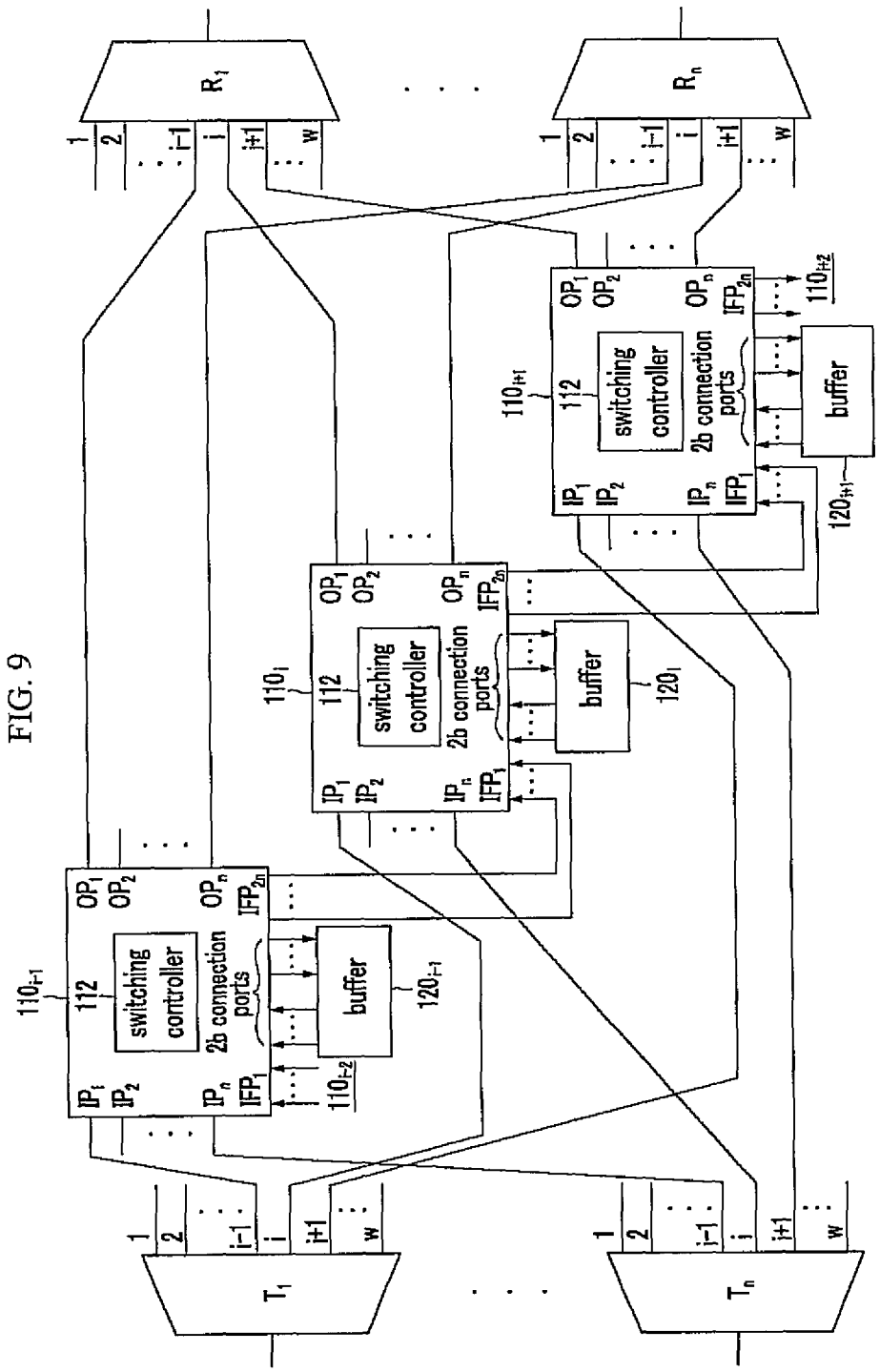
FIG. 9 is a view schematically showing a packet switching system applied to an optical network.

FIG. 9 is a view schematically showing a packet switching system applied to an optical network.

FIG. 9 is an illustration of a packet switching system which shows only three switch fabrics $110_{i-1}$, $110_i$, and $110_{i+1}$ among the switch fabrics $110_1$ to $110_w$ and buffers $120_{i-1}$, $120_{i+1}$, and $120_{i+1}$ allocated thereto.

In an optical network, communication is performed in a wavelength division multiplexing (WDM) scheme. The wavelength division multiplexing (WDM) technology can increase the transmission capacity of a single optical fiber by multiplexing optical signals of different wavelengths in one optical fiber to transmit them and separating the optical signals by wavelength at the receiving end.

Referring to FIG. 9, transmitting node devices $T_1$ to $T_n$, multiplex optical signals of different wavelengths in one optical fiber to transmit them, and receiving node devices $R_1$ to $R_n$ demultiplex the received optical signals by wavelength.

The switch fabrics $100_1$ to $100_w$ can receive optical packets transmitted at respective assigned wavelengths from the receiving node devices $T_1$ to $T_n$. Moreover, the switch fabrics $100_1$ to $100_w$ can transmit optical packets of appropriate wavelengths to the corresponding receiving node devices $R_1$ to $R_n$. Here, w is the number of wavelengths. That is, an optical packet transmitted at the j-th wavelength from the i-th transmitting node device $T_i$ is input through the i-th input port $IP_i$ of the j-th switch fabric $100_j$.

An optical packet switched to the i-th output port $OP_i$ of the j-th switch fabric $100_j$ is input into the i-th receiving node device $R_i$ at the j-th wavelength of the i-th receiving node device $R_i$.

In the event of packet competition even in this structure, competing packets are processed in the same way as previously described.

That is, in the case that competing packets are generated in the (i−1)-th switch fabric $100_{i-1}$, the i-th switch fabric $100_i$ can receive an optical packet from the (i−1)-th switch fabric $100_{i-1}$ through switch connection ports. Upon receiving an optical packet from the (i−1)-th switch fabric $100_{i-1}$ through switch connection ports, in order to convert the received optical packet into an optical packet of the i-th wavelength, the i-th switch fabric $100_i$ processes the optical packet to the buffer $120_i$ connected to the current switch fabric $100_i$ or processes the optical packet or processes the optical packet based on the rule for switching the received optical packet to the adjacent (i+1)-th switch fabric $100_{i+1}$ without switching the received optical packet immediately to the output port. At this point, in the case of performing buffering in the buffer $120_i$ connected to the current switch fabric $100_i$, the buffer $120_i$ outputs the optical packet at the i-th wavelength of the receiving node device corresponding to the destination. Thus, when the output port of the receiving node device corresponding to the destination of the buffered packet is idle, the buffer $120_i$ converts the optical packet received from the (i−1)-th switch fabric $100_{i-1}$ through the switch connection ports into an optical packet of the i-th wavelength and switches it to the corresponding output port.

By doing so, no wavelength competition may occur in the receiving node devices $R_1$ to $R_n$.

For example, if there are two optical packets in the (i−1)-th switch fabric $100_{i-1}$ that are transmitted in the (i−1)-th wavelength and the destination of these packets is the receiving node device $R_1$, the (i−1)-th switch fabric $100_{i-1}$ switches one of the optical packets of the (i−1)-th wavelength to the output port $OP_1$ corresponding to the receiving node device $R_1$. The buffer $120_{i-1}$ connected to the other optical packet of the (i−1)-th wavelength is forwarded to the adjacent i-th switch fabric $100_i$. At this point, the i-th switch fabric $100_i$ may buffer the optical packet transmitted at the (i−1)-th wavelength in the buffer $120_i$ or forward it to the adjacent (i+1)-th switch fabric $100_{i+1}$ to convert the optical packet into the i-th wavelength. In the case that the i-th switch fabric $100_i$ buffers the optical packet transmitted at the (i−1)-th wavelength in the buffer, the buffer $120_i$ switches the corresponding optical packet to the output port $OP_1$ when the output port $OP_1$ corresponding to the receiving node device $R_1$ is idle. At this point, in order for the optical packet transmitted at the (i−1)-th wavelength to be received at the i-th wavelength by the receiving node device $R_1$, the buffer $120_i$ converts the optical packet of the (i−1)-th wavelength into an optical signal of the i-th wavelength and switches it to the output $OP_1$.

The switch fabrics $100_1$ to $100_w$ can be implemented as Benes networks each consisting of passive medium optical switching elements. Specifically, each of the switch fabrics $100_1$ to $100_w$ can be implemented as a Benes network consisting of broadband optical switches so as to switch signals of all wavelengths. On the contrary, the packet switching system 100 according to the exemplary embodiment of the present invention may be applied to various networks for communication using frequency division, time division, and space division schemes.

According to an exemplary embodiment of the present invention, competing packets generated in any one of the plurality of switch fabrics connected in cascade through the input and output switch connection ports can be processed not only by means of the buffer allocated to the current switch fabric but also by means of the buffer assigned to a neighboring switch fabric, thereby reducing the packet loss rate.

Further, according to an exemplary embodiment of the present invention, network expandability can be improved merely by increasing the number of switch fabrics without any hardware changes in the switch fabrics even if the network size becomes large. Also, less buffer ports and interfaces are required, compared to a single switch fabric, so the cost for implementing the overall packet switching system can be reduced.

Moreover, because the internal buffer sharing rate and the external buffer sharing rate can be controlled depending on network status, a generally acceptable packet loss rate can be ensured even if the network status changes.

The exemplary embodiments of the present invention are not implemented only by a device and/or method, but can be implemented through a program for realizing functions corresponding to the configuration of the exemplary embodiments of the present invention and a recording medium having the program recorded thereon. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A packet switching system comprising:
a plurality of serially connected switch fabrics for receiving and processing a transmitted packet having a destination address; and a plurality of buffers respectively connected to each of the plurality of switch fabrics, each switch fabric comprising:
first switch connection ports for connecting to a first switch fabric adjacent in a first direction;
second switch connection ports for connecting to a second switch fabric adjacent in a direction opposite to the first direction; and
first buffer connection ports for forwarding competing packets,
wherein each switch fabric further comprises a switching controller that, if there are a plurality of first competing packets, switches a number of competing packets equal to the number of available first buffer connection ports among the plurality of first competing packets to the first buffer connection ports and switches the competing packets in excess of the number of available first buffer connection ports among the plurality of first competing packets to the first switch connection ports.

2. The packet switching system of claim 1, wherein each switch fabric further comprises:
a plurality of input ports for receiving a packet: and
a plurality of output ports for forwarding the packet input through the plurality of input ports to a destination,
wherein the switching controller switches the input packet to an output port corresponding to the destination, and
if there are a plurality of packets destined for one output port, the plurality of first competing packets comprise the remaining packets excluding one packet to be switched to the one output port.

3. The packet switching system of claim 2, wherein the switching controller configures the switch fabric to receive competing packets from the second switch fabric through the second switch connection ports, and
the plurality of first competing packets further comprise the competing packets received through the second switch connection ports.

4. The packet switching system of claim 3, wherein the switching controller preferentially switches the remaining packets among the plurality of first competing packets to the available first buffer connection ports.

5. The packet switching system of claim 1, wherein each switch fabric further comprises a sharing ratio controller for controlling the number of first switch connection ports, the number of second switch connection ports, and the number of first buffer connection ports.

6. A method for a switch fabric of a packet switching system to switch a packet, the method comprising:
checking the destination address of a packet input through a plurality of input ports;
if there are a plurality of packets having a specific output port among a plurality of output ports as the destination, switching only one of the plurality of packets to the specific output port;
if there are competing packets having the same destination address including the remaining packets excluding one of the plurality of the packets, switching a number of packets equal to the number of available buffer connection ports among the plurality of buffer connection ports for connecting to a first buffer allocated to the switch fabric and buffering the packets; and
forwarding the packets in excess of the number of available buffer connection ports among the competing packets having the same destination address to a neighbor switch fabric adjacent in a first direction.

7. The packet switching method of claim 6, further comprising receiving packets from a neighbor switch fabric adjacent in a second direction opposite to the first direction,
wherein the competing packets further comprise the packets received from the neighbor switch fabric adjacent in the second direction.

8. The packet switching method of claim 7, wherein the buffering comprises preferentially buffering the remaining packets.

9. The packet switching method of claim 7, wherein the forwarding comprises switching the excess packets to first switch connection ports for connecting to the neighbor switch fabric adjacent in the first direction, and
the receiving comprises receiving packets from the neighbor switch fabric through second switch connection ports for connecting to the neighbor switch fabric adjacent in the second direction.

10. The packet switching method of claim 9, further comprising controlling the number of buffer connection ports and the number of first and second switch connection ports depending on the network status.

11. The packet switching method of claim 6, further comprising switching the buffered packets to the output port when the output port corresponding to the destination of the buffered packets is idle.

12. A packet switching system in an optical network, comprising:
a plurality of switch fabrics connected in series for receiving packets of respective assigned wavelengths and switching the packets to a destination; and
a plurality of buffers respectively connected to each of the plurality of switch fabrics,
each of the plurality of switch fabrics comprising:
a plurality of buffer connection ports for respectively connecting to the plurality of buffers;
first switch connection ports for connecting to a neighbor switch fabric adjacent in a first direction;
second switch connection ports for connecting to a neighbor switch fabric adjacent in a second direction opposite to the first direction; and
a switching controller that switches at least a portion of first competing packets generated in itself and second competing packets received from the neighbor switch fabric adjacent in the second direction through the second switch connection ports to available ones of the plurality of buffer connection ports,
wherein the switching controller switches the remaining packets not switched to the buffer connection ports, among the first competing packets and the second competing packets, to the first switch connection ports.

13. The packet switching system of claim 12, wherein each of the buffers converts the wavelength of the second competing packets switched through the buffer connection ports into another wavelength assigned thereto, and
the switching controller switches the second competing packets converted into the wavelength assigned thereto to the destination.

14. The packet switching system of claim 13, wherein the plurality of switch fabrics further comprise:
a plurality of input ports for receiving the packets; and
a plurality of output ports for switching the packets to the destination,
wherein the plurality of input ports correspond to a plurality of transmitting devices for transmitting the packets, and the plurality of output ports correspond to a plurality of receiving devices corresponding to the destination.

15. The packet switching system of claim 14, wherein each of the buffers converts the wavelength of the second competing packets switched through the buffer connection ports when the output port corresponding to the destination is idle.

16. The packet switching method of claim 14, wherein
- the switching controller switches input packets to the output port corresponding to the destination of the packets input through the plurality of input ports, and
- the first competing packets comprise the remaining packets excluding one packet switched to the output port among the plurality of packets destined for one output port.

* * * * *